April 10, 1951  F. F. WILLMS  2,547,990
MAGNETIC PICKUP
Filed Nov. 21, 1945  2 Sheets-Sheet 1
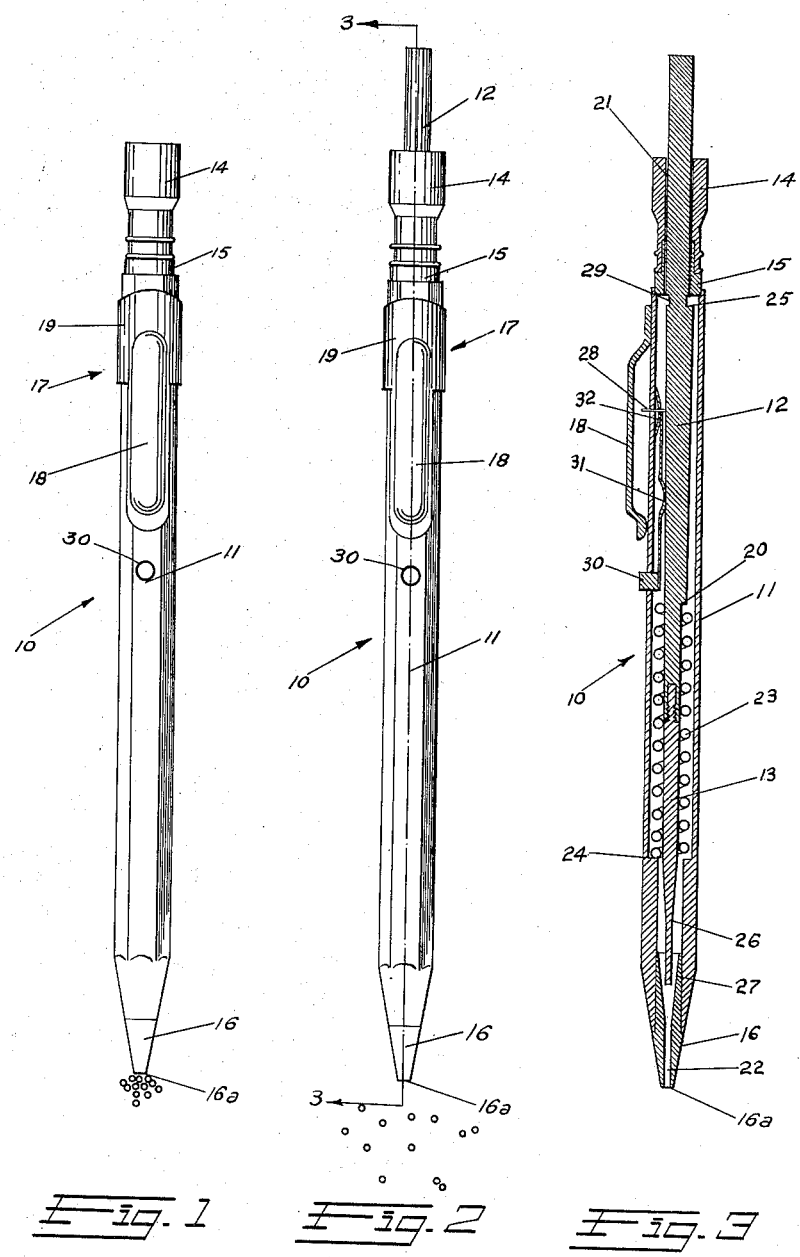
INVENTOR.
Frank F. Willms
BY
Ralph L. Chappell
ATTORNEY April 10, 1951

F. F. WILLMS 2,547,990

MAGNETIC PICKUP

Filed Nov. 21, 1945

INVENTOR.
Frank F. Willms
BY
Rodurick B. Jonso
ATTORNEYS

Patented Apr. 10, 1951

2,547,990

UNITED STATES PATENT OFFICE 2,547,990

MAGNETIC PICKUP

Frank F. Willms, East Rockaway, N. Y.

Application November 21, 1945, Serial No. 630,108

7 Claims. (Cl. 294—65.5)

(Granted under the act of March 3, 1883, as amended April 30, 1928; 370 O. G. 757)

This invention relates in general to a magnetic device and in particular to a magnetic pickup for small ferro-magnetic articles.

It is the purpose of this invention to provide a device that is simple and convenient for use in picking up and placing small articles such as small ball-bearings, screws, nuts, bolts, and other small iron and steel parts encountered frequently in machine shop and repair shop work. For example, small ball-bearings, which are extremely difficult to remove from either a flat or a rough surface, inasmuch as they have a strong tendency to slide from the grasp when they are picked up in the fingertips, are adapted to be picked up by the subject device.

Accordingly it is an object of this invention to provide a mechanical pickup for small ferro-magnetic articles.

Another object is to provide a magnetic pickup adapted to pick up and release small articles.

An additional object is to provide a pickup comprising a permanent magnet mounted slidably within a casing adjacent to one end of the casing whereby small ferro-magnetic articles may be picked up and released.

Further objects and advantages of this invention, as well as its construction, arrangement and operation, will be apparent from the following description and claims in connection with the accompanying drawings in which Fig. 1 is a longitudinal side elevation of a magnetic pickup showing a preferred embodiment of this invention and showing a number of small ferro-magnetic articles retained thereby;

Fig. 2 is a similar view of the device shown in Fig. 1 in which small articles have been released from the pickup;

Fig. 3 is a longitudinal cross section of the device shown in Fig. 2 taken along the line 3—3 of Fig. 2.

Figure 4:
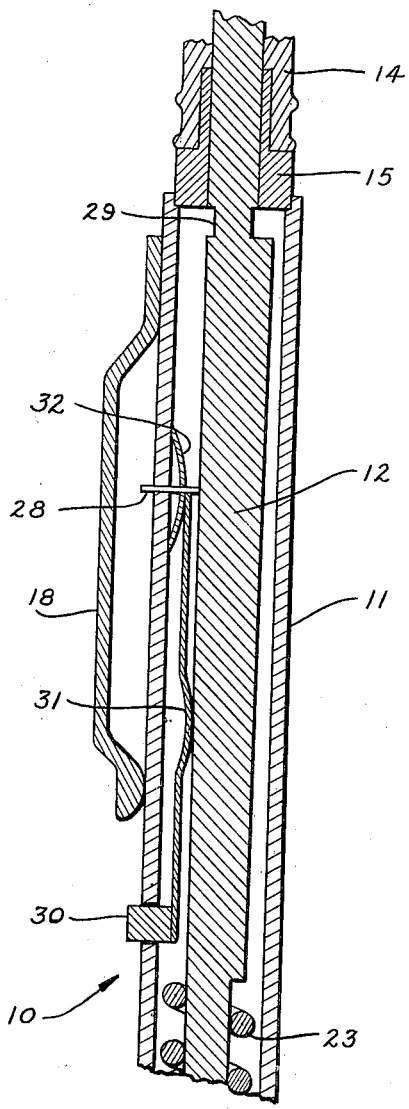
Fig. 4 is an enlarged detail showing of the latch and release mechanism of the device.

A magnetic pickup generally designated 10 includes a case 11 having a shaft 12 mounted slidably therein and having a magnet 13 on the end of the shaft within the case adjacent to one end of the device.

Case 11 comprises a generally tubular member preferably constructed of a non-magnetic material such as hard rubber, wood, plastic or the like. At the upper end of the case is mounted a cap 14. Said cap 14 is either mounted directly on the case or by means of an intermediate member 15. The intermediate member 15 and the cap 14 can be mounted by any convenient method, such as a snug mechanical fit, a glued joint, or the like.

The lower end of the case is somewhat tapered and a tip 16 is mounted in this tapered lower end to bring the lower end of the case assembly substantially to a point 16a. The tip 16 is constructed of a non-magnetic material such as those enumerated in connection with the case 11. It will be understood, of course, that this tip 16 and the cap 14 can be integral portions of the case 11 instead of being separable members.

Mounted slidably along the outside of the case 11 is a clip member 17 comprising a clip arm 18 and a clip ring 19, the ring passing around the case 11 and engaging the case slidably. Preferably, the size of the magnetic pickup 10, and its general shape and appearance closely approximate an ordinary mechanical pencil so that the device is adapted to be carried on the person. For example, it can be clipped to a pocket by means of clip member 17.

In Fig. 3, which illustrates the internal structure of the device, the operation of the mechanical pickup is apparent. The shaft 12 extends at one end a short distance beyond the cap 14 of the device, passing through the cap 14, the intermediate member 15, and partially through the case 11. Mounted on the lower end of the shaft 12 is a small rod-like permanent magnet 13, which in the condition shown in Fig. 3 terminates a short distance before the end of the tip 16 and in the condition shown in Fig. 1 terminates substantially flush with the point 16a of the tip 16. The shaft 12 is adapted to fit closely within a bore 21 through the cap 14 and intermediate member 15. Similarly, the permanent magnet 13, at least at its lower end, is adapted to fit closely a bore 22 in the tip 16. Thus the shaft and magnet are mounted slidably and guided by the cap at one end and the tip at the other end.

Positioned within the case 11 and surrounding the shaft 12 is a spring 23, which bears at one end against a shoulder 20 on the shaft 12 and which bears at its other end against a shoulder 24 on the inner surface of the case 11. This spring is constructed and positioned to exert a constant force urging the shaft 12 upward within the case 11. Optionally, on the shaft 12 near its upper end is a shoulder 25, which is positioned to be brought to bear against a mating surface on the intermediate member 15, whereby the upward motion of the shaft within the case is terminated at a predetermined position. The lower limit of the motion of the shaft 12 within case 11 can be set by a tapered surface 26 on the magnet 13, which surface is adapted to be brought to bear against a mating tapered surface 27 on the tip 16; alternatively, the lower limit of this motion can be set by the length of the shaft 12 protruding above cap 14. According to the form of the invention shown in Fig. 3 these two methods of limiting the motion of this shaft are combined and the tapered surface 26 on the magnet bears against the corresponding tapered surface 27 on the tip 16 at the same time that the upper end of the shaft 12 is flush with the upper end of the cap 14.

A release pin 28 is mounted snugly but slidably in a corresponding opening in the case 11, preferably in a position to be hidden by clip arm 18. This release pin is positioned to project into a slot or notch 29 in the shaft 12 when the shaft is depressed to the operating position shown in Fig. 1. The release pin 28 coacting with notch 29 thus is adapted to fix the shaft in this operating position. A release button 30 is mounted at one end of a rocker 31 within the case 11 and projects through the side of the case. The other end of this rocker 31 is connected to the release pin 28 and to a spring 32, which is adapted and positioned to force the release pin into slot 29. When button 30 is depressed, rocker arm 31 is rotated slightly to remove release pin 28 from pin slot 29, thereby permitting the shaft to be moved within the case. At this same time, rocker 31 is forced against the shaft 12, thereby causing the motion of the shaft to be retarded. In this way, when button 30 is depressed, shaft 12 is free to move and is caused to move by spring 23, but at the same time the friction between rocker 31 and shaft 12 prevents the shaft from moving suddenly.

Optionally, button 30 is so positioned and clip arm 18 is so constructed that the clip can be slid along the case 11 to retain the button in a depressed position. In this way the release pin 28 can be withheld constantly from slot 29 simply by sliding the clip 17 to the position at which it retains button 30.

The operation of this device is obvious from an examination of Fig. 3. Shaft 12 is depressed to bring the end of magnet 13 substantially flush with the point of the device. The point is then brought into direct contact or near contact with a ferro-magnet article which it is desired to pick up. The article, or a series of articles as shown in Fig. 1, is then cupped and held at the point of the device and can be carried and placed in any desired position. The release button 30 is then pressed, permitting shaft 12 and accordingly magnet 13 to be moved upward within the device. This causes the magnet to be removed from the article held thereby and accordingly causes the article to be released. The point of the device fits snugly around the end of magnet 13 and prevents any article larger in diameter than the point of the magnet from being drawn into the case 11 and insures that the upward motion of shaft 12 will draw the magnet away from such an article and deposit it in a desired position.

Various modifications and changes can be made in the subject device without departing from the scope of the invention.

The invention described herein may be manufactured and used by or for the Government of the United States of America for government purposes without the payment of any royalties thereon or therefor.

I claim:
1. A magnetic pickup for small ferro-magnetic articles, said pickup comprising a hollow tubular case, a shaft slidably mounted in the case and having a permanent magnet at one end thereof, a spiral spring mounted within the case and around the shaft urging the shaft in a direction away from the end on which said magnet is mounted, said shaft extending beyond said case to permit propelling the shaft against the urging of the spring to bring the magnet substantially flush with an opening in said tubular case, and a release mechanism for releasably securing the shaft in said position with the magnet flush with the opening, said release mechanism comprising a rocker arm mounted in the casing and rocking against said shaft and having a pin at one end to engage said shaft when said end of the arm is depressed and having a button on the other end of said rocker arm to depress said end, raise the pin-mounting end, and force the rocker arm into contact with the shaft, whereby the shaft is permitted to undergo retarded motion with respect to said rocker arm and casing.

2. A magnetic pickup and release for small ferro-magnetic articles comprising a casing, a shaft carried slidably in said casing, a permanent magnet mounted on said shaft and slidable within said casing to bring said magnet to an opening in said casing, means to retract said magnet from said opening carried in said case, a release mechanism comprising a rocker arm mounted in the casing and rocking against said shaft and having a pin at one end to engage said shaft when said end of the arm is depressed and having a button on the other end of said rocker arm to depress said end, raise the pin-mounting end, and force the rocker arm into contact with the shaft, whereby the shaft is permitted to undergo retarded motion with respect to said rocker arm and casing.

3. A magnetic pickup for ferro-magnetic articles comprising a case, a shaft mounted slidably in said case and having a magnet at one end thereof, the other end of said shaft extending beyond said case, means to retract said magnet from proximity to an opening in one end of said case, said means being carried in said case, means to secure said magnet proximate said opening carried by said case, and a rocker arm mounted in said case, said rocker arm being adapted to retard operation of said retracting means.

4. A magnetic pickup for ferro-magnetic articles comprising a case, a shaft mounted slidably in said case and having a magnet at one end thereof, the other end of said shaft extending beyond said case, means to retract said magnet from proximity to an opening in one end of said case, said means being carried in said case, and a rocker arm mounted in said case, said rocker arm being adapted to retard operation of said retracting means.

5. A magnetic pickup for ferro-magnetic articles comprising a case, a shaft mounted slidably in said case and having a magnet at one end thereof, the other end of said shaft extending beyond said case, means to retract said magnet from proximity to an opening in one end of said case, said means being carried in said case, a pin mounted in said case and adapted to engage a notch in said shaft to prevent movement of said shaft relative said case, a clip mounted on said case and slidable relative said case, said clip being adapted to secure said pin out of engagement with said notch, and means to retard operation of said retracting means carried by said case.

6. A magnetic pickup for ferro-magnetic articles comprising a case having an end opening, a shaft mounted slidably in said case and having a magnet at one end thereof, the other end of said shaft extending beyond said case a distance substantially equal to the distance said magnet is retracted from said opening, means to secure said magnet proximate said opening carried by said case, and a rocker arm mounted in said case, said rocker arm being adapted to retard operation of said retracting means.

7. A magnetic pickup for ferro-magnetic articles comprising a case having an end opening, a shaft mounted slidably in said case and having a magnet at one end thereof, the other end of said shaft extending beyond said case a distance substantially equal to the distance said magnet is retracted from said opening, a spring carried in said case normally urging said magnet to retracted position in said case, a pin mounted in said case and adapted to engage a notch in said shaft to prevent movement of said shaft relative said case, a clip carried on and slidable relative said case, and a rocker arm mounted in said case and bearing against said shaft, said rocker arm having one end secured to said pin and the other end secured to a button extending through said case, said button being adapted to be depressed by said clip to secure said pin out of engagement with said notch.

FRANK F. WILLMS.

REFERENCES CITED

The following references are of record in the file of this patent:

UNITED STATES PATENTS

| Number | Name | Date |
|---|---|---|
| 512,381 | Keyes | Jan. 9, 1894 |
| 1,234,794 | Orson | July 31, 1917 |
| 1,903,047 | Impey | Mar. 28, 1933 |

FOREIGN PATENTS

| Number | Country | Date |
|---|---|---|
| 11,952 | Great Britain | May 13, 1897 |